(12) United States Patent
Autechaud et al.

(10) Patent No.: US 6,321,361 B1
(45) Date of Patent: Nov. 20, 2001

(54) PROCESS FOR DETECTING ERRORS IN A SERIAL LINK OF AN INTEGRATED CIRCUIT AND DEVICE FOR IMPLEMENTING THE PROCESS

(75) Inventors: Jean-François Autechaud, Paris; Christophe Dionet, Ivry sur Seine, both of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/102,023

(22) Filed: Jun. 22, 1998

(30) Foreign Application Priority Data

Jun. 26, 1997 (FR) .................................... 97 07997

(51) Int. Cl.[7] .................................... G06F 11/10
(52) U.S. Cl. .......................... 714/807; 714/799
(58) Field of Search .................... 714/807, 799, 714/821, 808, 820

(56) References Cited

U.S. PATENT DOCUMENTS 5,832,031 * 11/1998 Hammons, Jr. ...................... 375/262

FOREIGN PATENT DOCUMENTS

| 0280013 | 8/1988 | (EP) . |
| 2097653 | 3/1982 | (GB) . |

OTHER PUBLICATIONS

G.R. Stephens et al.: Fibre Channel the Basics 1995, Ancot Corp., Menlo Park, CA., USA XP002060314, pp. 1–0 –pp. 1 –14 pp. 6–0 –pp. 8–17.

C.J. Georgiou et al.: "Scalable Protocol Engine For High Bandwidth Communications", 1997 IEEE Int. Conf. On Communications, vol. 2, Jun. 8, 1997, Montreal, Quebec, Canada, pp. 1121–1126, XP002060851.

Richard Nass: Fibre Channel Transceiver UPS Brandwidth Maintains Design Ease. Electronic Design, vol. 45, No. 10, May 12,1997, USA, pp. 69–72, XP000698867.

C.J. Hossack et al.: "Fully Entire Document Interconnected Fault–Tolerant Networks Using Global Link Adapters" Transputer Applications and Systems '94, Sep. 5, 1997, Como, Italy, pp. 489–496, XP002060313.

Patent Abstracts of Japan vol. 010, No. 223 (P–483), Aug. 5, 1986 & JP 61 059547 A (Yokogawa Hokuskin Electric Corp), Mar. 27, 1996, Abstract.

Patent Abstract of Japan vol. 008, No. 269 (P–319), Dec. 8, 1984 & JP 59 136843 A (Yokogawa Hokushin Denki KK), Aug. 6, 1984, Abstract.

* cited by examiner

*Primary Examiner*—Phung M. Chung
(74) *Attorney, Agent, or Firm*—Miles & Stockbridge P.C.; Edward J. Kondracki (57) ABSTRACT

The present invention relates to a process for detecting errors in an integrated circuit constituting a high-speed serial-parallel communication port and which allows a restart in case of an error, the port (10⁰) comprising, in a sending part (40) which encodes each message, at last one buffer (TDBUF) for data to be transmitted issuing from a parallel bus and, in a receiving part (41), at least one buffer (RDBUF) for data to be received, the process comprising:

checking the consistency of the messages, checking the consistency of a character stream constituting the messages, verifying the synchronous and cyclical utilization of the buffers of the sending (40) (TDBUF) and receiving (41) (RDBUF) parts, and checking the data of the messages by calculating a cyclic redundancy check (CRC) code on the data of each message.

26 Claims, 8 Drawing Sheets

| Transformation as a result of a disturbance | becomes | |
|---|---|---|
| was | Control character | Normal character |
| Normal character | Unexepected control character (between start and end of frame) | Detection of the error by the CRC |
| Control character | Several possible cases of direction | Unexpected normal character (outside start and end of frame) |

| Transformation as a result of a disturbance | becomes | | | | |
|---|---|---|---|---|---|
| was | cc_repos | cc_debut de cadre j | cc_fin de cadre | cc_jeton#i expected | cc_jeton#1 unexpected |
| cc_repos | X | next character = unexpected cc (cc_repos or start-of-frame) | unexpected cc | token out of order (upon reception of the next token) and possibility of writing in an occupied receiving buffer | token out of order (immediately) |
| cc_debut de cadre i | next character = unexpected nc (first character of a message) | the detection occurs due to the fact that the end-of-frame is not in the right place | unexpected cc: end-of-frame not associated with a start-of-frame | next character = unexpected nc (1st character of a message) and token out of order, either immediately or later | |
| cc_fin de cadre | end-of-frame absent (start-of-frame indicating the length of the message) | | error in the error indication (duplicated in the header of the message) and/or sender-receiver desynchronization | end-of-frame absent (the start-of-frame indicating the length of the message) | |
| cc_jeton#i | token out of order (upon reception of the next token) | next character = unexpected cc (normal character expected) | unexpected cc | X | token out of order |

FIG. 8

PROCESS FOR DETECTING ERRORS IN A SERIAL LINK OF AN INTEGRATED CIRCUIT AND DEVICE FOR IMPLEMENTING THE PROCESS

CROSS REFERENCE TO RELATED APPLICATION

This application is related to application Ser. No. 09/020,671, filed Feb. 9, 1998, in the names of Jean-Francois AUTECHAUD and Christophe DIONET for "Device and Process for Detecting Errors in an Integrated Circuit Comprising a Parallel-Serial Port". The subject matter of said application is hereby incorporated by reference in its entirety. Said application is assigned to the assignee of the present invention.

BACKGROUND OF THE INVENTION

1. Field of the Invention

The present invention relates to a process for detecting errors in a serial link of an integrated circuit and to a device for implementation of the process. The invention relates more particularly to a process and device for detecting errors in a serial link of an integrated circuit, or between two integrated circuits, comprising a parallel-serial and serial-parallel port.

The invention is especially applicable when it is desirable to use gigabit-rate serial links having an error rate that is non-null, for example on the order of $10^{-15}$ to $10^{-17}$, to produce an internal link to a logic unit which would normally be produced by a parallel link that is not prone to interference. This substitution is motivated by the fact that high-speed serial links have many advantages. For example, high-speed serial links provide high density and ease of connection with an identical passband, and allow a long link, for example up to 10 meters, which is impossible with standard internal logical links.

2. Description of Related Art

In the case where the serial link is a 1-gigabaud serial link, and assuming that two ports of the same type are communicating with one another through the serial link, allowing machines whose error rate in terms of message corruption and calibration loss and/or protocol inconsistency is on the order of $10^{-17}$ to communicate with one another, it will be noted, taking into account the speed of the serial link and the error rate of the machine, that this seemingly low error rate can generate a substantial error and an abnormal operation of the machine every two days.

Integrated circuits comprising interfaces between a parallel bus and a serial bus are known, but in general they do not comprise a device and process for detecting and recovering from errors, since they are based on the principle that the communication does not include any errors involving the serial link, or if it does include any, the detections of errors and recoveries from errors are handled in a higher layer (calibration loss) at the software level.

SUMMARY OF THE INVENTION

Therefore, a first object of the invention is to propose a process that allows the detection of errors and the verification of the proper operation of the communication of a serial link.

This object is achieved due to the fact that the process for detecting errors in an integrated circuit constituting a high-speed serial-parallel communication port between a parallel bus and a serial link, the port comprising, in a sending part, at least one buffer for data to be transmitted issuing from the parallel bus, and in a receiving part, at least one buffer for data to be received, the sending part inserting each message or data set into a frame of control characters that convey information on the messages in question, the sending part coding the characters of the messages at the bit level, the receiving part performing a complete verification of the messages before the message is written into the receiving buffer or buffers, the buffers of the sending and receiving parts being equal in number and used synchronously and cyclically, the process comprising:

a step for on-the-fly consistency checking of the messages at the level of their coding into bits, a step for on-the-fly consistency checking of the character stream constituting the messages, a step for on-the-fly checking that the buffers of the sending and receiving parts are being used synchronously and cyclically, and a step for on-the-fly checking of the data of the messages by calculating the cyclic redundancy check (CRC) code on all the data of each message to be transmitted.

According to another characteristic, the sending part codes the characters of the messages so as to try to have a null direct current component, giving each character a start bit and a stop bit, the step for on-the-fly consistency checking of the messages at the level of their coding into bits being carried out by the receiving part and comprising:

a step for verifying that each character begins with a start bit and ends with a stop bit, and a step for verifying that the accumulated current imbalance of the codes in the message flow is contained within a predetermined range of values.

According to another characteristic, the messages or data are constituted by so-called normal characters, control characters comprising null characters or idle messages, start-of-frame characters containing information on the format of the messages contained in the frames in question, such as the length and/or the type of the message, end-of-frame characters containing information on the validity of the messages contained in the frames in question and on the identity of the source buffer of the message, and flow control characters (tokens), each of which is associated with a respective receiving buffer and intended to indicate the availability of the buffer in question, the step for on-the-fly consistency checking of the character stream constituting the messages detecting the transformations, as a result of disturbances, of normal characters into control characters and vice versa, the transformations of normal characters into other normal characters being detected by the CRC, or later by an accumulated current imbalance error.

According to another characteristic, the step for on-the-fly checking that the buffers of the sending and receiving parts are always used synchronously and cyclically comprises:

a step for the verification by the receiving part that the identification or number of the sending buffer of the current message corresponds to the identification or number of the associated receiving buffer, that is, that the output pointer of the sending buffer corresponds to the input pointer of the receiving buffer, a step for generating a token indicating that a receiving buffer has been cleared and that the latter is now free, a step for checking that the tokens generated during the clearing of the receiving buffers have been generated cyclically.

According to another characteristic the process comprises a step for verifying that the receiving buffer intended to receive the current message is free, a message being sent to the receiving part only if the necessary space within it is available.

According to another characteristic, at the initialization of the serial link all the receiving buffers are empty and the input and output pointers of the sending and receiving buffers are at zero.

According to another characteristic, the transmitted information is 9/12 encoded by associating with the normal character, formed by a nine-bit byte, the code whose balance relative to the direct current component is chosen so as to cause the cumulative imbalance to tend to zero, a direct/inverse coding bit, and filling it out to 12 bits with a start character and a stop character.

According to another characteristic, the range within which the accumulated current imbalance of the codes of the message flow must be contained is [+10; −10].

Another object of the invention is to propose a device for implementation of the process.

This object is achieved due to the fact that the device for detecting errors in an integrated circuit comprising a serial link control function for constituting a high-speed serial-parallel communication port between a parallel bus and a serial link, the port comprising, in a sending part, at least one buffer for data to be transmitted issuing from the parallel bus and means for serializing on output, and in a receiving part, at least one buffer for data to be received and means for deserializing on input and means for checking the data of the messages by calculating the cyclic redundancy check (CRC) code on all the data of each message to be transmitted, the sending part comprising means for inserting each message or data set into a frame of control characters that convey information on the messages in question, and means for coding the characters, the receiving part comprising means for isolating the characters of the messages by separating the messages from the control characters and means for the complete verification of the messages before the latter are written into the receiving buffer or buffers, the sending and receiving parts having the same number of buffers, the buffers being used synchronously and cyclically, the device comprising means for on-the-fly consistency checking of the messages at the level of their coding into bits, means for on-the-fly consistency checking of the character stream constituting the messages, and means for on-the-fly checking that the buffers of the sending and receiving parts are being used synchronously and cyclically.

According to another characteristic, the means for coding the characters ensure that the characters of the messages are coded into bits in such a way as to have a null direct current component and give each character a start bit and a stop bit, the means for on-the-fly consistency checking of the messages at the level of their coding into bits verifying that each character begins with a start bit and ends with a stop bit and that the accumulated current imbalance of the codes of the message flow remains contained within a predetermined range.

According to another characteristic, the messages or data are constituted by so-called "normal" characters; the control characters comprising null characters or idle messages, start-of-frame characters containing information on the format of the messages contained in the frames in question, such as the length and/or the type of the message, end-of-frame characters containing information on the validity of the messages contained in the frames in question and on the identity of the source buffer of the messages, the control characters also comprising flow control characters (tokens), each of which is associated with a respective receiving buffer and intended to indicate the availability of the buffer in question, the step for on-the-fly consistency checking of the character stream constituting the messages detecting the transformations, as a result of disturbances, of normal characters into control characters and vice versa, the transformations of normal characters into other normal characters being detected by the CRC.

According to another characteristic, the means for checking that the buffers of the sending and receiving parts are being used synchronously and cyclically comprise means for verifying that the identification or number of the sending buffer of the current message corresponds to the identification or number of the associated receiving buffer, means for generating a token indicating that a receiving buffer has been cleared and that the latter is now free, and means for checking that the tokens generated during the clearing of the receiving buffers have been generated cyclically.

According to another characteristic, the error detecting device comprises means for verifying that the receiving buffer intended to receive the current message is free, a message being sent to the receiving part only if the necessary space within it is available.

According to another characteristic, the error detecting device comprises means for counting the number of free receiving buffers, and means for identifying them.

According to another characteristic, the error detecting device comprises means which ensure the clearing of the receiving buffers and which set the input and output pointers of the sending and receiving buffers to zero upon initialization of the serial link.

According to another characteristic, the error detecting device comprises two buffers for data to be transmitted and two buffers for data to be received.

According to another characteristic, the serial link operates in a continuous mode, null characters or idle messages being disposed in the continuous stream between the characters or messages that have significance.

According to another characteristic, the messages are requests or responses to requests.

BRIEF DESCRIPTION OF THE DRAWINGS

Other characteristics and advantages of the present invention will become more clearly apparent with the reading of the following description, given in reference to the appended drawings illustrating a non-limiting embodiment of the invention, in which:

FIG. 7B shows a table detailing the possible cases of errors listed by the table of FIG. 7A, FIG. 8 schematically represents the mode for controlling the flow of messages between the buffers of the sending and receiving parts of the integrated circuit constituting a serial-parallel interface port according to the invention.

DESCRIPTION OF THE PREFERRED EMBODIMENT(S)

Figure 1:
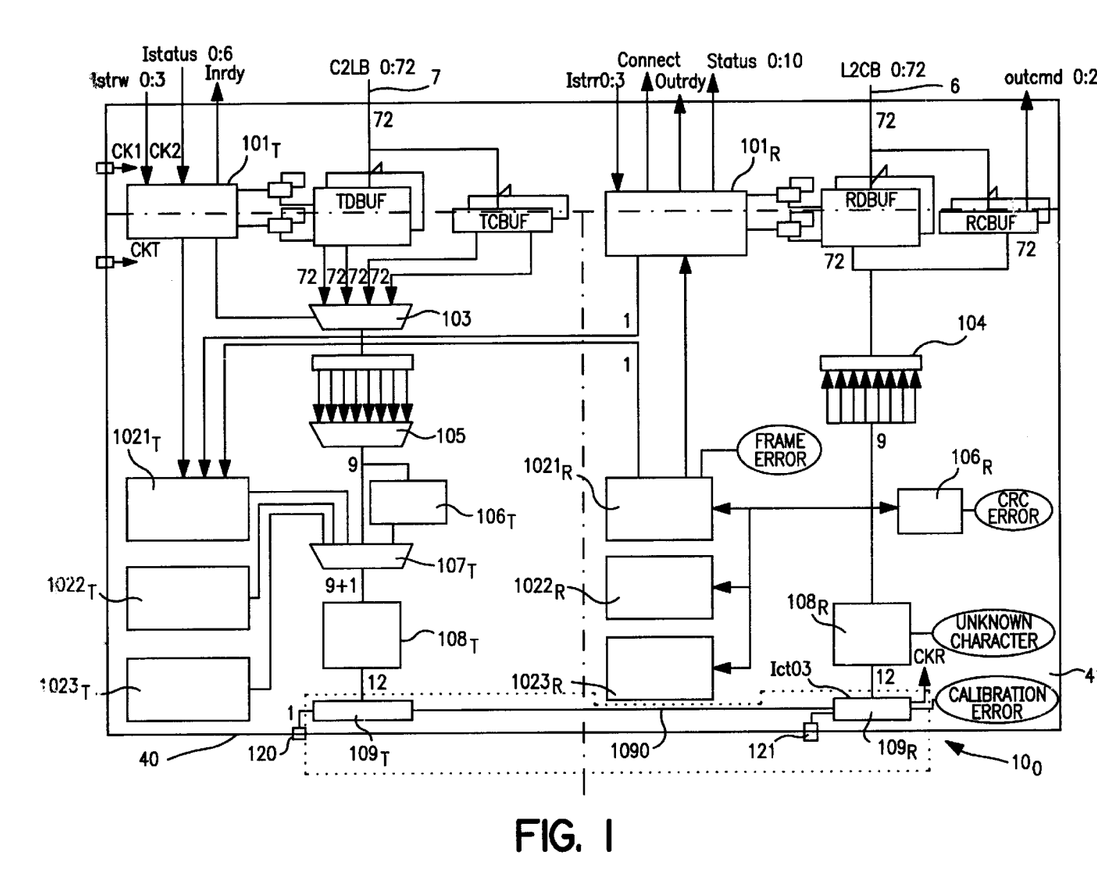
FIG. 1 shows the part of an integrated circuit constituting a serial-parallel interface port according to the invention.
Figure 2A:
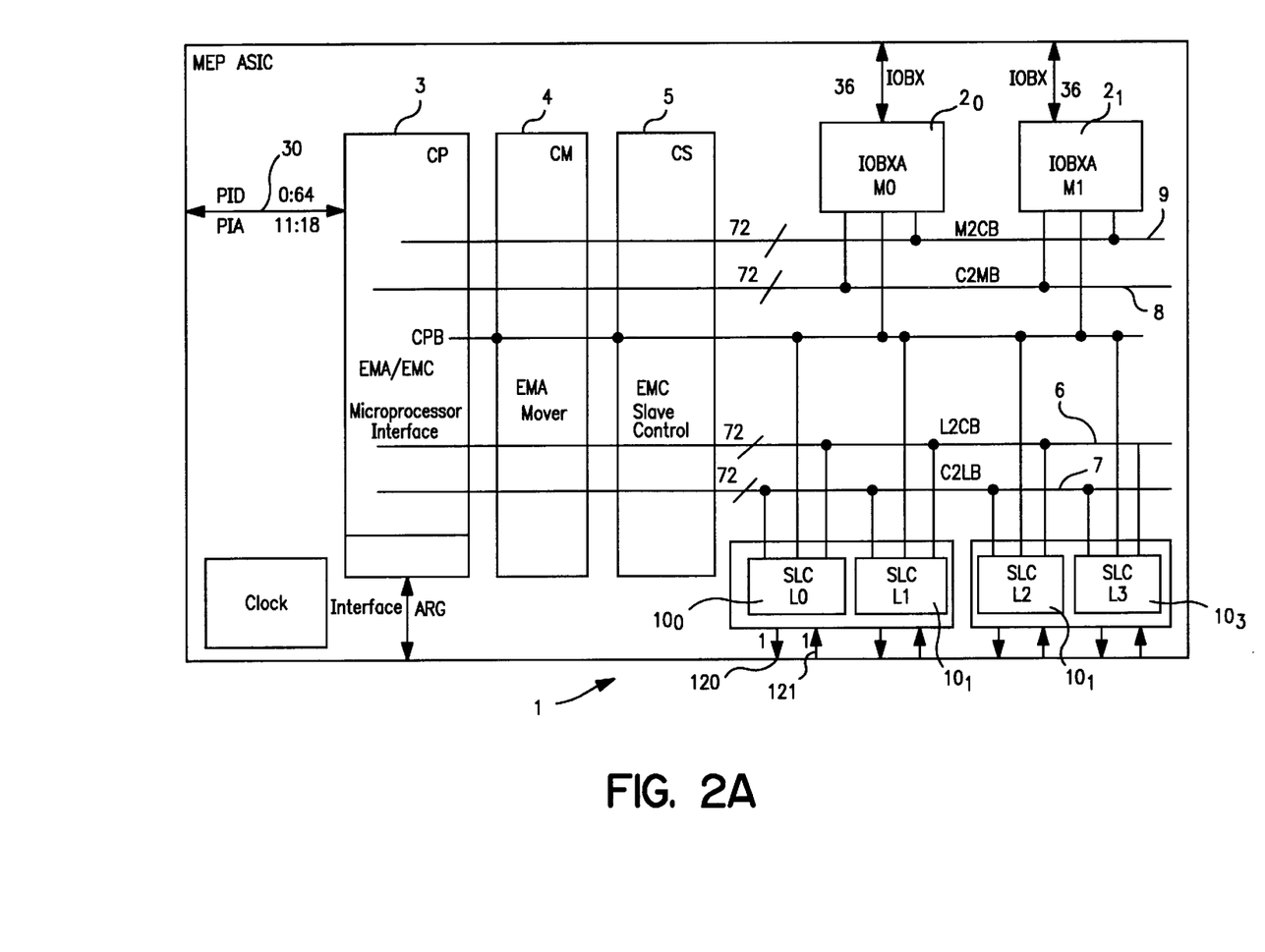
FIG. 2A shows the general diagram of an integrated circuit incorporating an interface port of this type.
Figure 2B:
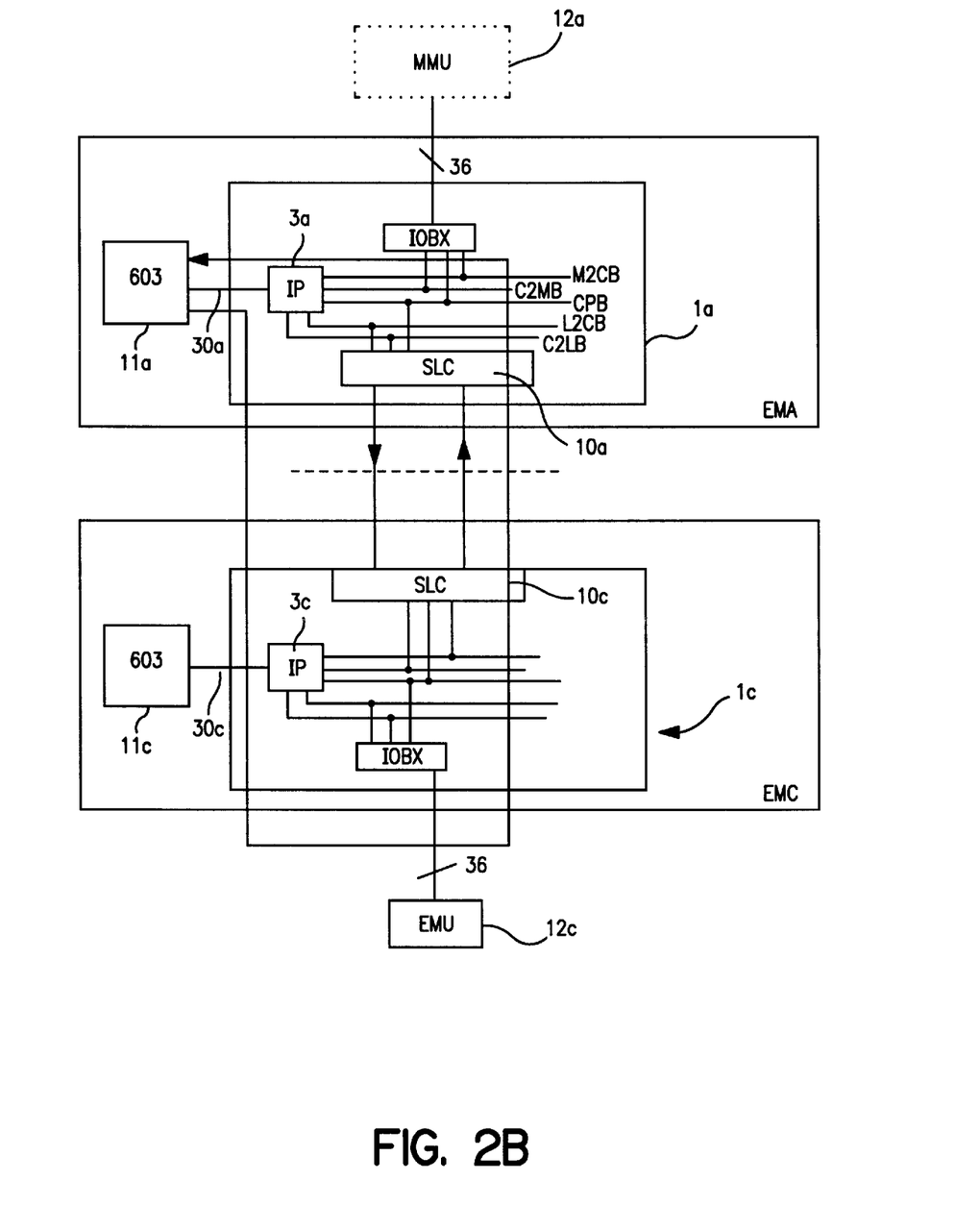
FIG. 2B shows the architectural diagram of a machine using the integrated circuit of FIG. 2A.

The port $10_0$, also called the control block of the serial link SLC (Serial Link Control) is incorporated into an integrated circuit, for example of the type represented in FIG. 2A. This integrated circuit (1) comprises a plurality of ports $10^0$, $10^1$, $10^2$, $10^3$ of the same type as that of FIG. 1, which communicate at a system frequency of for example 33 MHz with two parallel 72-bit data busses, L2GB for input (6) and C2LB for output (7). These parallel busses communicate with logic circuits (3, 4, 5), performing for the circuit (3) a functionality for interfacing with a microprocessor through a 64-bit bus (30), for the circuit (4) a move functionality (MOVER) for the integrated circuit when the latter is incorporated into a data-type card, and for the circuit (5) a memory control functionality (Slave Control). These circuits (3, 4, 5) also communicate through two 72-bit data busses M2CB (9), C2MB (8), with two input-output interfaces IOBX $2^0$, $2^1$ that allow communication with 36-bit data busses issuing either from a main memory MMU (12a, FIG. 2B) or an expanded memory EMU (12c) as represented in FIG. 2B. A control bus CPB allows the microprocessor communicating with the integrated circuit (1) to access the control and status registers of the various circuits (3, 4, 5, 2, 10) present in the integrated circuit. This integrated circuit (1) is used in a machine comprising a main memory (12a), and an expanded memory (12c) which can be shared by several systems. A first master integrated circuit (1a) according to the invention communicates through the bus (30a) with a first processor (11a) and through the interface IOBX with the memory (12a), while a second slave integrated circuit (1c) communicates, on the one hand, with the first master circuit (1a), and on the other hand through the bus (30c) with a second processor (11c) and with an expanded memory (12c). The port (10a) for parallel-serial transmission and serial-parallel reception in the circuit (1a) comprises for the sending part (40, FIG. 1) a pair of 8×72-bit data buffers TDBUF connected to the transmitting bus C2LB. The terms transmitting and sending have identical meanings and hereinafter are used interchangeably. A multiplexer (103) makes it possible to select either of two buffers TDBUF or either of two buffers TCBUF of control signals which contain the header. A buffer TCBUF and a buffer TDBUF can be unified to form a buffer TBUF. The information leaving the multiplexer (103) is sent through a disassembly circuit (105), which generates a sequence of 9-bit characters constituting the characters to be transmitted. This disassembly circuit (105) is also connected to a circuit for generating a cyclic redundancy check character CRC ($106_T$). A second multiplexer (107) makes it possible to select the signals transmitted to an encoder ($108_T$) which allows the 9/12 encoding of the transmitted information by associating a check bit with the normal character formed by a nine-bit byte, and filling it out to 12 bits with a start bit and a stop bit. The start and stop bits are for example equal to 1 and 0, respectively. These start and stop bits are used for the calibration of the link and, as described above, also allow detection of consistency errors in the coding of the characters at bit level. This 10-bit coding provides 1024 possibilities. Thus, for example, there are 512 so-called "normal" characters which convey the data and 126 control characters used for encoding information other than data. The normal characters comprise data and or cyclic redundancy check characters (CRC). The control characters comprise null characters or idle messages, start-of-frame characters, end-of-frame characters, and flow control characters (tokens), each of which is associated with a respective receiving buffer (RDBUF). The messages or data are conveyed in frames. The start-of-frame characters contain information on the format of the messages contained in the frames in question, such as the length and/or the type of the message. The end-of-frame characters contain information on the validity of the messages and on the identity of the source buffer (TDBUF). The flow control characters (tokens) are intended to indicate the availability of the respective buffers. The start-of-frame and end-of frame characters frame the normal characters constituting the messages, The end-of-frame control characters indicate whether the characters in the frame include a header, that is a set of, for example, eight 9-bit words, which contains information on the type of message conveyed, information on the source of the request and information on the validity of the message. The header also contains either data, in the case where the message is an interrupt, or a memory address, in the case where the message is a request. The information on the validity of the message that is contained in the header indicates, in the case where the message is a memory access request, whether the message has been conveyed and whether the memory has delivered an error message, for example a single error or a double error. The 9/12 encoding is performed so that the signal transmitted through the serial link does not include any direct current component (DC balancing). The control characters have a balanced digital code, meaning that they comprise as many zeroes as ones. Thus, the control characters that are idle messages are constituted by six ones followed by six zeroes. The normal characters are either balanced, or have two codes with the same absolute imbalance value. The 9/12 encoding is performed so that the accumulated current imbalance of the codes of the message flow is contained within a range [+10; −10]. For this reason, the sending part (40, FIG. 3) knows the imbalance of each character as well as the global current imbalance of the transmission. When a character to be transmitted has two opposite coding versions, for example +3 or −3, the sending part codes this character so as to cause the global imbalance to tend to zero.

The multiplexer (107) receives signals issuing from a transmitting status unit ($1021_T$) of the serial link comprising at least one 2-bit token counter, wherein each bit representing a token indicates the availability of the associated buffer. The multiplexer (107) receives signals issuing from a substitution status unit ($1022_T$), and signals issuing from a port initialization status unit ($1023_T$). The output from the encoder ($108_T$) is linked to a serializer circuit ($109_T$) whose output constitutes a serial line (120) which sends signals at a speed of, for example, 1 gigabit/sec. The serializer is also connected by a serial loop link (1090) to a deserializer ($109_R$) of the receiving circuit, or receiving part (41) of the port ($10^0$). This serial loop link (1090) is validated in the deserializer ($109_R$) by a signal (Ict03). Each transmitting buffer is controlled by a transmitting buffer management status unit ($101_T$) which receives Istatus 0:6, Istrw 0:3, and sends the signal Inrdy. In the receiving part (41), the deserializer ($109_R$) is connected to a decoder ($108_R$) which operates on the same principle as the encoder ($108_T$) of the transmitting circuit. This decoder of the receiving circuit sends the 9 bits of each datum to a data assembly circuit (104) for transforming the data received serially into a 1×72, 3×72, 8×72, 9×72-bit message, which is loaded into a pair of data receiving buffers (RDBUF). This pair of data receiving buffers (RDBUF) is controlled by a receiving buffer management unit ($101_R$) and is associated with a pair of receiving control buffers (RCBUF) which contain the headers of the messages. The output from the decoder ($108_R$) of the receiving circuit is branched to a message verification code circuit ($106_T$), which generates a cyclic redundancy check character CRC for comparison. The $CRC_{N+1}$ is updated after each reception of 9 data bits, by calculating the CRC in 16 bits using a cyclic permutation algorithm from the data received $D_i$ and from the values $R_i$ of the bits of the previous $CRC_N$. Of course, the CRC could be calculated in 18 bits instead of 16 bits. The information transmitted by this decoder ($108_R$) is also transmitted to a status unit constituting a history buffer ($1022_R$), to a status unit of the receiving port ($1021_R$), and to a port initialization status unit ($1023_R$). The receiving buffer management status unit ($101_R$) sends three signals (Connect, Outrdy, Status 0:10) and receives as input through three lines the information (Istrr 0:3). The signal (Outrdy) indicates that the output is ready; this signal indicates that there is a complete message waiting to be read. The signal Status indicates the status of the outputs: whether or not they are interrupts, whether or not they are indivisible operations, memory access or register access, local or remote, ISCON or non-ISCON, microprocessor/mover (MOVER)/slave (SLAVE) source, whether or not they are delayed responses, whether or not this is the last message, whether or not there is a data error, whether or not there is external memory access, and whether or not this is an insignificant message. The output Connect indicates that the port SLC ($10^0$) is disconnected when this output is deactivated. The inputs Istrr allow the reading of the receiving ports in FIFO order, and the command which reads the last double word of a message causes the generation of a flow control character (token) associated with the buffer, which thus becomes free. This flow control character is transmitted from the receiving buffer management status unit ($101_R$) to the transmission management status unit ($1021_T$), and through the latter to the multiplexer (107) in order to transmit this information to the input port (10c) of the card (1c), associated in the serial link with the receiving port ($109_R$) whose receiving buffers (RDBUF) have just been read. The transmitting buffer management status unit ($101_T$) comprises two inputs Istatus and Istrw, and one output Inrdy. This output Inrdy indicates that there is a free transmission buffer (TDBUF) waiting to be written. The lines Istatus make it possible to specify the types of messages to be written, and to determine, as a function of the value of the first two status bits, the following indications: 00 not in use, 01 data only, 10 header, 11 header and data. The third bit Istatus indicates whether or not this is the last message. The fourth bit indicates whether or not there is a data error; and the fifth bit indicates whether or not there is external access to the memory. Lastly, the signal Istrw makes it possible to write the transmitting buffers (TDBUF) in FIFO order. The signal Istrw, which writes the last double word of a message, initializes the transmission of the message as soon as a remote receiving buffer (RDBUF) (for example of the port 10c) is declared to be free by a receiving port connected to the serial link (120), and when any current transmission from another sending buffer of the same parallel-serial port has terminated.

Figure 3:
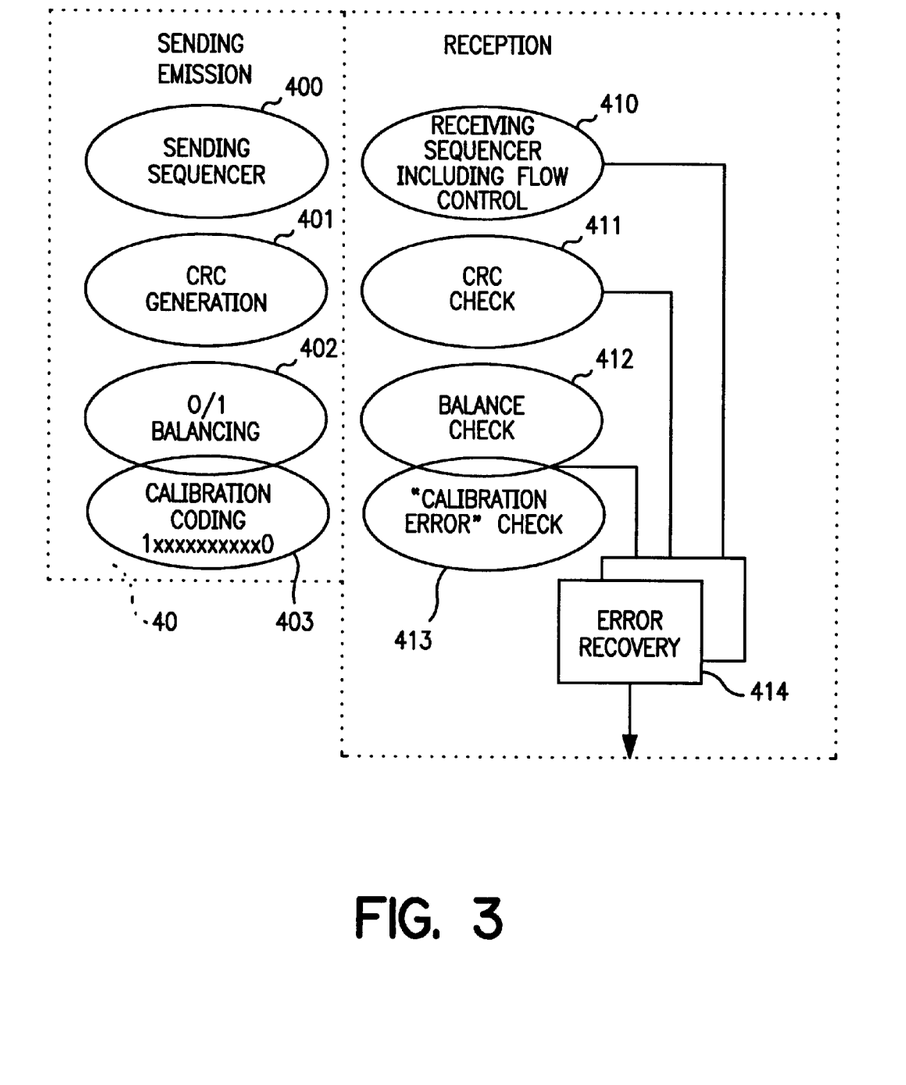
FIG. 3 shows a simplified diagram of the sending logic and receiving logic of the integrated circuit constituting a serial-parallel interface port according to the invention.

FIG. 3 represents, in a simplified way, the transmitting (40) and receiving (41) parts or logics of the integrated circuit constituting a serial-parallel interface port according to the invention. The transmitting logic (40) comprises a message sending sequencer (400) which corresponds to the transmitting status unit ($1021_T$) of FIG. 1. The sending logic (40) ensures the generation (401) of the CRC for each message by the circuit ($106_T$, FIG. 1), which calculates the cyclic redundancy check (CRC) code on all the data of each message to be transmitted and associates each non-null message to be transmitted with its calculated CRC. The frame of the message is constituted by a start-of-frame control character followed by a header, by data or by a header and data, followed by an end-of-frame character and finally by the CRC. The sending logic (40) also performs, by means of the circuit ($108_T$, FIG. 1) as described above, the coding of the characters at bit level, while ensuring the balancing (402) of zeroes and ones, as well as the coding (403) for calibrating each character by making it start with a 1 (start) and end with a 0 (stop). The receiving logic (41) ensures the on-the-fly consistency checking of the coding of the messages at the bit level by means of the circuit ($108_R$, FIG. 1), the consistency checking of the character stream by means of the circuit ($1021_R$, FIG. 1), and the checking of the data of the messages by recalculating the CRC in the circuit ($106_R$, FIG. 1). Moreover, as described in greater detail below, the error detecting device also verifies that the buffers of the sending (40) (TDBUF) and receiving (41) (RDBUF) parts are always synchronous and used cyclically. The sending logic (40) is duplicated by the receiving logic (41). Thus, the receiving logic (41) comprises a receiving sequencer (410) which checks the consistency of the character stream and which corresponds to the status unit ($1021_R$) of the receiving port of FIG. 1. Thus, the receiving sequencer (410) checks the consistency of the character stream constituting the messages in order to detect the transformations, as a result of disturbances, of normal characters into control characters and vice versa. The transformations of normal characters into other normal characters are detected by the check operation of the CRC (411) performed by the circuit ($106_R$, FIG. 1). The receiving logic (41) also verifies that the current imbalance at the bit level is contained within the range [+10; −10]. Lastly, the receiving logic (41) checks, by means of the operation (413) performed by the circuit ($109_R$), whether or not the characters have a calibration error, that is, whether or not all of them begin with a start bit and end with a stop bit. Any inconsistency detected in the message flow by the receiving sequencer (410) during the check CRC (411), during the balance check (412), or during the calibration error check, sends an error message to an error recovery logic (414). This error recovery logic (414) is the only part of the receiving logic that does not have a counterpart in the sending logic. No matter which part detects the error, the sending (40) and receiving (41) parts are placed in the error state and the link is automatically reinitialized.

Figure 5:
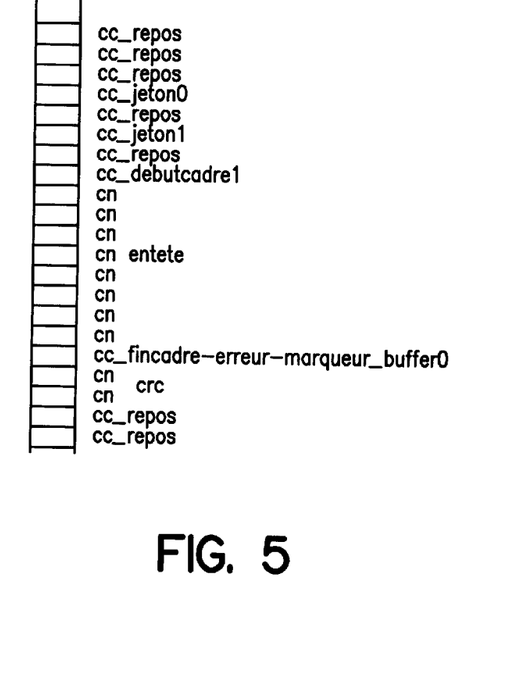
FIG. 5 represents an example illustrating a character string of the stream of characters generated by the sending sequencer of FIG. 3.

FIG. 5 represents an example illustrating a character string of the stream of characters conveyed by the serial link. The serial link operates in a continuous mode, which means that null characters or idle messages are disposed in the continuous stream between the characters or messages that have significance. The exemplary character string of FIG. 5 begins with three idle control characters (cc_repos) in succession, then continues with the token (cc_jeton0) of the buffer number 0, followed by an idle character, then a control character for start-of-frame number 1 (cc_débutcadre1), then eight normal characters (cn), then an end-of-frame control character (cc_fincadre), then two eight-bit characters of the CRC, etc. The control characters that are the token number 0 and the token number 1 are generated in order to indicate that the receiving buffer number 0 and the receiving buffer number 1, respectively, (RDBUF) (FIG. 7) have been cleared and that the latter are free. The buffers (TDBUF, RDBUF) of the sending (40) and receiving (41) parts are equal in number and are always in phase and used cyclically. In the non-limiting exemplary embodiment described, there are two sending buffers (TDBUF), respectively numbered 0 and 1 and two receiving buffers (RDBUF), respectively numbered 0 and 1 (FIG. 8). of course, as a variant, a number of sending and receiving buffers greater than two could be provided.

Figure 4:
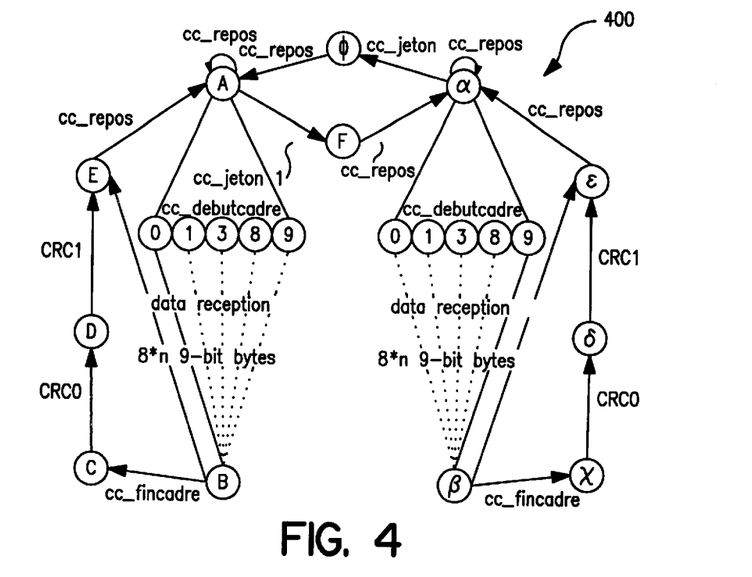
FIG. 4 shows a simplified state graph of the sending sequencer of FIG. 3.

FIG. 4 shows a simplified state graph of the status unit for controlling the character stream that constitutes the sending sequencer (400), illustrating the logical sequence of the various characters of the messages. Thus, in order to send the exemplary sequence of FIG. 5, the sending sequencer (400) can start, for example, from the point ($\alpha$) and loop back to itself three times in order to symbolize the sending of the sequence of the first three idle characters. Next, the sending sequencer (400) sends the token number 0, proceeding to the point ($\phi$). It is noted at this stage that the next character sent cannot be anything but an idle character. This means that after a token, the sending sequencer (400), in proceeding to point A, sends at least one idle character, in order to prevent two tokens from immediately following one another. The sequence of FIG. 5 continues with the sending of the token number 1, that is, the sending sequencer (400) proceeds to the step (F). Then the sending sequencer (400) sends an idle character in order to return to the point ($\alpha$). Next, a start-of-frame character number 1, then eight nine-bit bytes or normal characters are sent in order to arrive at point ($\beta$). Then, after the end of the data of the message formed by the normal characters, the sending sequencer (400) must send an end-of-frame character ($\chi$), followed by a first CRC, or CRC number zero (point $\delta$), then a second CRC, or CRC number 1 (point $\epsilon$). Lastly, the sending sequencer (400) returns to the point ($\alpha$) by sending an idle character. The entire character stream is sent according to the same principles described above in reference to the right side of FIG. 4 for the first buffer and to the left side of FIG. 4 for the second buffer.

Figure 6:
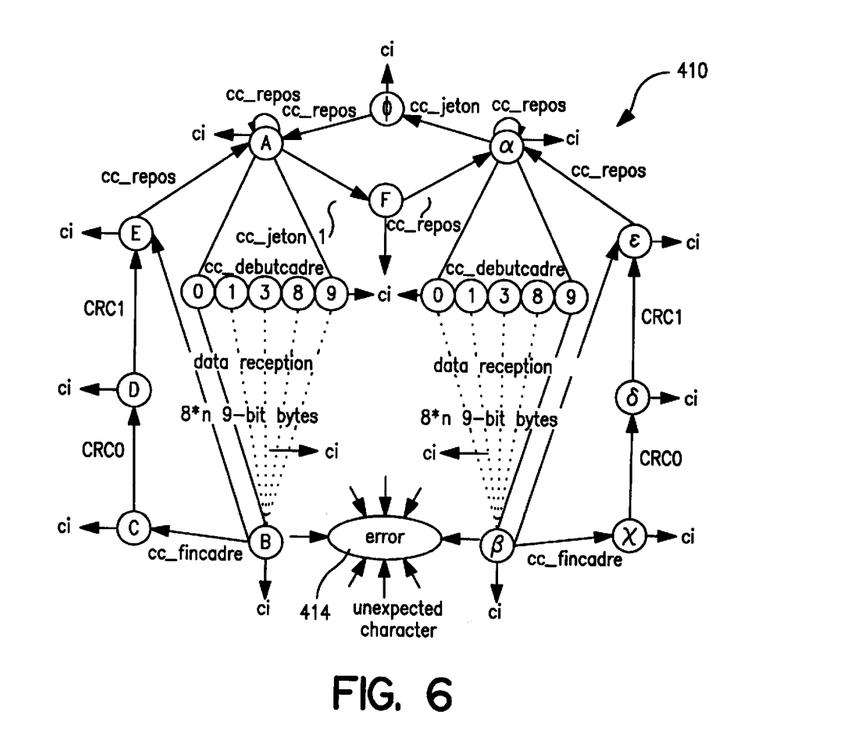
FIG. 6 shows a simplified state graph of the receiving sequencer of FIG. 3.

FIG. 6 shows a simplified state graph of the receiving sequencer (410) of FIG. 3, illustrating the control of the logical sequence of the various characters of the messages. The logic of the receiving sequencer (410) constitutes a duplication of the logic of the sending sequencer (400, FIG. 4); likewise, the graph of the receiving sequencer (410) is practically identical to that of the sending sequencer (400), the same elements being designated by the same references. The receiving sequencer (410) checks the consistency of the character string of the stream and sends an error message (414) when it detects an unexpected character (ci).

Figure 7A:
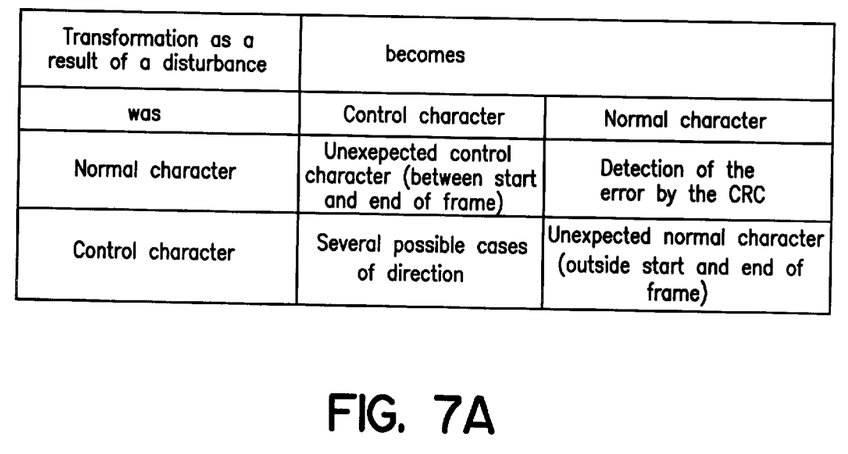
FIG. 7A shows a table listing the possible errors in the messages during the consistency check at the character level.
Figure 7B:
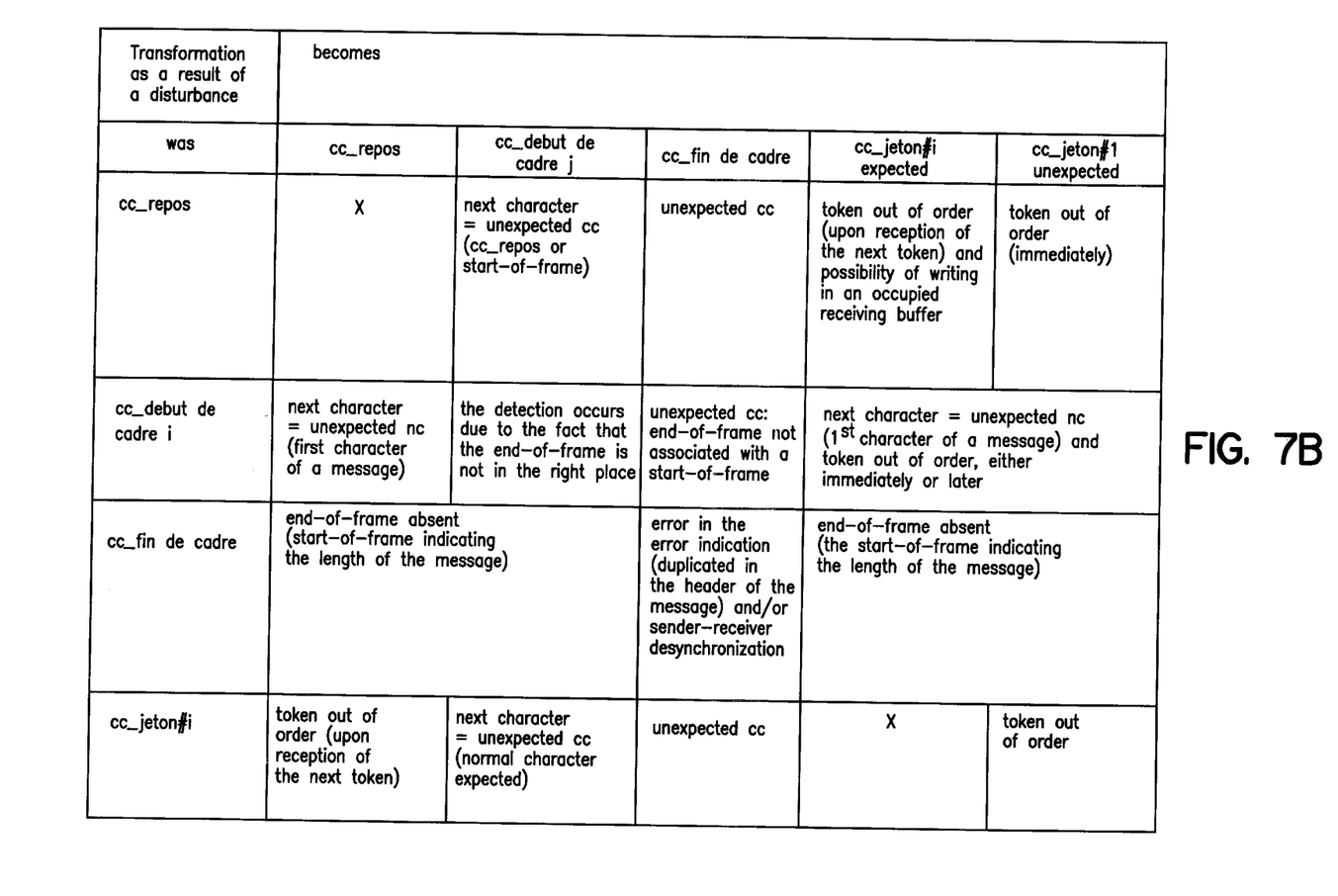

FIG. 7A shows a table listing the possible consistency errors in the character stream of the messages, detected by the receiving part (41). If, as a result of a disturbance, a normal character is transformed, between the sending and the receiving, into a control character (CC), the receiving sequencer (410) detects the latter as being an unexpected character (ci), since a control character cannot be located within a frame. If, conversely, a normal character is transformed, between the sending and the receiving, into another normal character, the error is detected at the level of the CRC. Likewise, if a control character is transformed, between the sending and the receiving, into a normal character, the receiving sequencer (410) detects the latter as being an unexpected character, since a normal character cannot be isolated outside a frame. The various cases possible when a control character (CC) is transformed into another control character (CC) are indicated in FIG. 7B.

If, as a result of a disturbance, an idle character is transformed, between the sending and the receiving, into another idle character, this does not constitute an error and therefore has no effect. If an idle character is transformed into a start-of-frame character, the character that follows it will be detected as an unexpected character. In effect, an idle character can only be followed by another idle character or a start-of-frame character or a token, all of which are contradictory to the start-of-frame character that has already been received erroneously. If an idle character is transformed into an end-of-frame character, the receiving sequencer (410) detects the latter as being an unexpected character (ci), since it is not associated with a start-of-frame character. If an idle character is transformed into a token number (i) which is expected, that is, which corresponds to the occupied buffer number (i), the receiving part (31) will detect, during the reception of the next token, that the tokens have arrived in the wrong order. It will be recalled that the buffers of the sending (40) (TDBUF) and receiving (41) (RDBUF) are always synchronous and used cyclically. For this reason, the receiving part (41) continuously verifies that the tokens number 0 and number 1, respectively associated with the receiving buffers (RDBUF) number 0 and number 1 are always sent in the same order. Moreover, the receiving logic (41) always knows which buffers are occupied and which buffers are free, the tokens corresponding to the occupied buffers being expected by the receiving part. An unwarranted reception of the expected token (i) can also be detected as an error almost immediately, since in this case the reception of this token (i) incorrectly indicates that the buffer number (i) is free to be written, which will trigger an error if an order to write in the occupied buffer (i) has been transmitted. If an idle character is transformed into a token number (j) that is unexpected, the receiving part (41) will detect the latter as an unexpected character, since the order of arrival of the tokens has not been maintained. If a start-of-frame character (i) is transformed into an idle character, the receiving sequencer (410) will detect the next character, that is, a normal character (cn), as being an unexpected character, since it is outside its frame. If a start-of-frame character (i) is transformed into a start-of-frame character (j), the receiving part (41) will detect the error due to the fact that the end-of-frame is not in the right place. In effect, it will be recalled that each start-of-frame character contains information on the length of the message in question, so the receiving part (41) expects to receive the end-of-frame character at a determined place. If a start-of-frame character (i) is transformed into an end-of-frame character, the receiving sequencer (410) will detect the latter as being an unexpected character, since the end-of-frame character is not associated with a start-of-frame character. If a start-of-frame character (i) is transformed into either an expected token (i) or an unexpected token (j), the receiving part (41) will detect the next character, that is, the first normal character of a message, as being an unexpected character. In effect, the first normal character of the message in this case is outside its frame. This error can also be detected, either immediately or later, due to the fact that the token sent in error arrives in the wrong order. If an end-of-frame character is transformed into an idle character or into a start-of-frame character (j), the receiving sequencer (410) will detect the error due to the fact that the expected end-of-frame character, whose position is given by the information contained in the start-of-frame character, is absent. If an end-of-frame character is transformed into another end-of-frame character, the receiving part (41) will detect the error due to the fact that there will be an inconsistency between the information contained in the header of the message and the information contained in the end-of-frame character. In effect, it will be recalled that the end-of-frame control characters contain information on the validity and the nature of the message, which information is duplicated in the header. The error can also be detected due to the fact that there is a desynchronization between the sending part (40) and the receiving part (41), the number of the buffer used also being coded into the end-of-frame control character. If an end-of-frame character is transformed into an expected token (i) or into an unexpected token (j), the receiving part (41) will detect the error, as described previously, due to the fact that the expected end-of-frame character is absent. If a token (i) is transformed into an idle character, the receiving part (41) will detect the error upon reception of the next token, since the latter will in effect arrive in the wrong order. If a token (i) is transformed into a start-of-frame character, the receiving sequencer (410) will detect the error due to the fact that the next character, that is, a normal character, will be absent. The error can also be detected later due to the fact that the tokens arrive in the wrong order. If a token (i) is transformed into an end-of-frame character, the receiving sequencer (410) will detect the latter as an unexpected character since it is not associated with a start-of-frame. Finally, if a token number (i) is transformed into an unexpected token number (j), the receiving part (41) will detect the error due to the fact that the tokens arrive in the wrong order.

Figure 8:
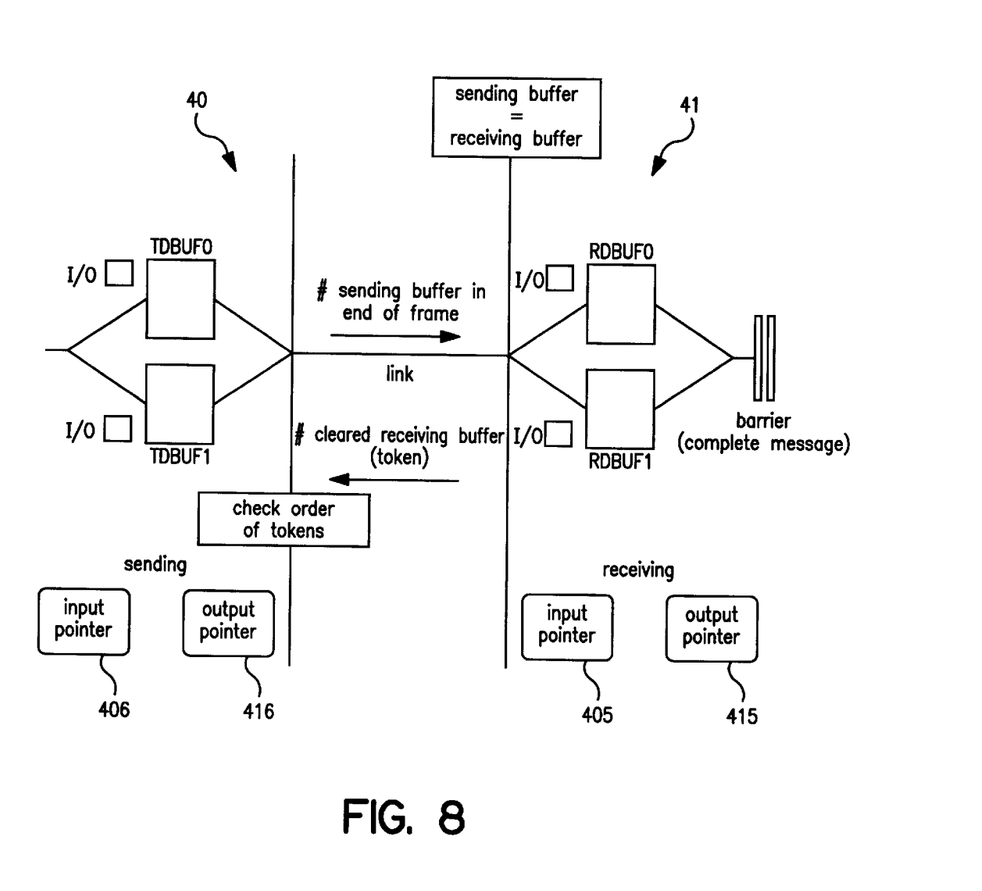

FIG. 8 illustrates the control of the flow of messages between the buffers of the sending (40) and receiving (41) parts of the integrated circuit constituting a serial-parallel interface port according to the invention. The two sending (40) or receiving (41) data buffers run on a specific system clock having a frequency corresponding to that of the internal bus of the integrated circuit. The two sending buffers (40) are respectively numbered 0 and 1 and the two receiving buffers (41) are respectively numbered 0 and 1. As described above, in order to verify that the buffers of the sending (40) and receiving (41) parts are always in phase and used cyclically, the error detecting device continuously checks that the tokens number 0 and number 1, respectively associated with the receiving buffers (41) number 0 and number 1, are always sent in the same order. This means that the receiving buffers are always cleared in the same order. Moreover, it will be recalled that the number of the sending buffer (40) is included in the end-of-frame character of the message. Thus, the receiving logic (41) continuously verifies that the number of the sending buffer of each message is equal to the number of the receiving buffer of this message. With these two checks, it is possible to verify precisely that the sending (40) and receiving (41) buffers are in phase and are being used cyclically. At the initialization of the serial link, all the receiving buffers (41) are empty and the input pointers (406, 405) and output pointers (416, 415) of the sending (40) and receiving (41) buffers are at zero. A message is only sent if the necessary space is available on the receiving end (41). For this reason, each of the buffers TDBUF of the sending part (40) and RDBUF of the receiving part (41) are provided with a check bit indicating whether the buffer in question is free or occupied (l/o). In this way, the sending logic (40) always knows which buffers are occupied and which buffers are free. A receiving buffer is only cleared after the complete reception of a message. The logic ($101_R$, FIG. 1) for reading the receiving buffers (41) is linked to all of the occupation status check bits of the buffers (RDBUF, FIG. 1) by an "OR" function. This means that reading the receiving buffers (41) is only possible if at least one of these receiving buffers RDBUF is occupied. The read and write operations in the buffers are asynchronous. It is only after the complete and correct reception of the entire message that the receiving part indicates to the outside that it is available to be read. This reception of a message is only complete after a verification, in addition to the consistency checks of the message described above, that the CRC recalculated by the receiving part is equal to the CRC received. This wait for the complete and correct reception of the entire message before its transmission has only a negligible effect on the latency of the process. In effect, the messages are essentially memory-to-memory transfers of 4K nine-bit bytes on average. Thus, the wait for the reception of 64 nine-bit bytes of each message before making it available is short relative to the time required to transfer 4K nine-bit bytes into memory.

In conclusion, six types of errors are detected, namely: calibration errors (presence of start and stop bits), errors due to the fact that an unexpected control or data character is detected in the character stream, consistency errors at the level of the frames, data errors detected by the CRC, errors caused by non-cyclic or out-of-phase utilization of the sending and receiving buffers, and lastly, errors in the accumulated current imbalance between the number of bits at 0 and the number of bits at 1 of the message flow when the difference between these numbers falls outside the range [−10; +10]. In this way, all the erroneous messages are detected and can be contained. It is understood that with these simple-to-use mechanisms in the input-output port of an integrated circuit, it is possible to detect errors and to verify the proper operation of the input-output port circuit in a high-speed serial link, thus ensuring the correction of errors, even if the error rate is very low. In effect, this exhaustive procedure for detecting errors, associated with a procedure for reinitializing the link and a procedure for purging all of the residual messages, makes it possible to use an unreliable link without user visibility as part of a logic system allowing, for example, one stop per year.

Other modifications within the scope of one skilled in the art are also part of the spirit of the invention.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for detecting errors in a high-speed serial-parallel communication port ($10^0$) between a parallel bus (L2CB, C2LB) and a serial link of an integrated circuit, the communication port ($10^0$) comprising a sending part (40) and a receiving part (41), the sending part having at least one buffer (TDBUF) for data to be transmitted issuing from the parallel bus, the receiving part (41) having at least one buffer (RDBUF) for data to be received, whereas the sending part (40) inserts each message or data set into a frame of control characters that convey information on the messages in question, and codes the characters of the messages at the bit level, and the receiving part (41) performs a complete verification of the messages before the message is written into the receiving buffer or buffers (RDBUF), characterized in that the buffers of the sending (40) and receiving (41) parts (TDBUF, RDBUF) of communication port ($10^0$) are equal in number and are used synchronously and cyclically, the process comprising:

a first step for on-the-fly consistency checking of messages at the level of coding of the messages into bits, a second step for on-the-fly consistency checking of a character stream constituting the messages, a third step for on-the-fly checking that the buffers of the sending (40) (TDBUF) and receiving (41) (RDBUF) parts are being used synchronously and cyclically, and a fourth step for on-the-fly checking of message data by calculating a cyclic redundancy check (CRC) code on all the data of each message to be transmitted.

2. The error detecting process according to claim 1, characterized in that the characters of the messages are coded by the sending part (40) so as to try to have a null direct current component, giving each character a start bit and a stop bit, and the first step for on-the-fly consistency checking of the messages at the level of coding of the messages into bits is carried out by the receiving part (41) and further comprising:

a fifth step for verifying that each character begins with a start bit and ends with a stop bit, and a sixth step for verifying that an accumulated current imbalance of the codes in the messages is contained within a predetermined range of values.

3. The error detecting process according to claim 2, characterized in that the messages are constituted by normal characters, namely control characters comprising null characters or idle messages, start-of-frame characters containing information on the format of the messages contained in the frames in question, such as the length and/or the type of the message, end-of-frame characters containing information on the validity of the messages contained in the frames in question and on the identity of a source buffer (TDBUF) of the message and flow control characters (tokens), each of which is associated with a respective second receiving buffer (RDBUF) and intended to indicate the availability of the buffer in question, and the process further comprises detecting transformations, of normal characters into control characters as a result of disturbances and vice versa, the transformations of normal characters into other normal characters being detected by the cyclic redundancy check, or later as an accumulated current imbalance error.

4. The error detecting process according to claim 3, characterized in that the third step for on-the-fly checking that the first and the second buffers TCBUF, RDBUF) of the sending (40) and receiving (41) parts are always used synchronously and cyclically comprises:

verification by the receiving part (41) that the identification or number of the first sending buffer (TDBUF) of a current message corresponds to the identification or number of the associated second receiving buffer (RDBUF), that is, that an output pointer of the first sending buffer (TDBUF) corresponds to an input pointer of the second receiving buffer (RDBUF), generating a token indicating that a second receiving buffer (RDBUF) has been cleared and that the latter is now free, and checking that the tokens generated during the clearing of the second receiving buffers (RDBUF) have been generated cyclically.

5. The error detecting process according to claim 4, characterized in that it further comprises verifying that the second receiving buffer (RDBUF) intended to receive the current message is free, and sending a message to the receiving part (41) only if the necessary space within the receiving part is available.

6. The error detecting process according to claim 4, characterized in that upon initialization of the serial link all the second receiving buffers (RDBUF) are empty and the input and the output pointers of the first sending (TDBUF) and the second receiving (RDBUF) buffers are at zero.

7. The error detecting process according to claim 2, characterized in that the range within which the accumulated current imbalance of the codes of the message flow is contained is [+10 to −10].

8. The error detecting process according to claim 1, characterized in that the messages are constituted by normal characters, namely control characters comprising null characters or idle messages, start-of-frame characters containing information on the format of the messages contained in the frames in question, such as the length and/or the type of the message, end-of-frame characters containing information on the validity of the messages contained in the frames in question and on the identity of a source buffer (TDBUF) of the message and flow control characters (tokens), each of which is associated with a respective second receiving buffer (RDBUF) and intended to indicate the availability of the buffer in question, and the process further comprises detecting transformations of normal characters into control characters as a result of disturbances and vice versa, the transformations of normal characters into other normal characters being detected by the cyclic redundancy check, or later as an accumulated current imbalance error.

9. The error detecting process according to claim 8, characterized in that the third step for on-the-fly checking that the first and the second buffers TCBUF, RDBUF) of the sending (40) and receiving (41) parts are always used synchronously and cyclically comprises:

verification by the receiving part (41) that the identification or number of the first sending buffer (TDBUF) of a current message corresponds to the identification or number of the associated second receiving buffer (RDBUF), that is, that an output pointer of the first sending buffer (TDBUF) corresponds to an input pointer of the second receiving buffer (RDBUF), generating a token indicating that a second receiving buffer (RDBUF) has been cleared and that the latter is now free, and checking that the tokens generated during the clearing of the second receiving buffers (RDBUF) have been generated cyclically.

10. The error detecting process according to claim 9, characterized in that it further comprises verifying that the second receiving buffer (RDBUF) intended to receive the current message is free, and sending a message to the receiving part (41) only if the necessary space within the receiving part is available.

11. The error detecting process according to claim 9, characterized in that upon initialization of the serial link all the second receiving buffers (RDBUF) are empty and the input and the output pointers of the first sending (TDBUF) and the second receiving (RDBUF) buffers are at zero.

12. The error detecting process according to claim 1, characterized in that the transmitted message is 9/12 encoded by associating with the normal character, formed by a nine-bit byte, the code whose balance relative to the direct current component is chosen so as to cause the cumulative imbalance to tend to zero, a direct/inverse coding bit and filling it out to 12 bits with a start character and a stop character.

13. A device for detecting errors in an integrated circuit for implementing an error detecting process in a high speed serial parallel communication port between a parallel bus (L2CB, C2LB) and a serial link, the integrated circuit comprising a serial link control function for constituting the high-speed serial-parallel communication port between the parallel bus (L2CB, C2LB) and the serial link, a port ($10^0$) including, in a sending part (40), at least one first buffer (TDBUF) for data of messages to be transmitted issuing from the parallel bus and means ($109_T$) for serializing on output, and in a receiving part (41), at least one second buffer (RDBUF) for data of messages to be received and means ($109_R$) for deserializing on input and means ($106_R$) for checking the data of the messages by calculating a cyclic redundancy check code on all the data of each message to be transmitted, characterized in that the sending part (40) comprises means for inserting each message or data set into a frame of control characters that convey information on the messages in question, and means ($108_T$) for coding the characters, the receiving part (41) comprising means for isolating the characters of the messages by separating the messages from the control characters and means ($1023_R$) for the complete verification of the messages before the latter are written into the receiving buffer or buffers (RDBUF), the sending (40) and receiving (41) parts having the same number of buffers, operating synchronously and cyclically, the device further comprising means ($1023_R$) for on-the-fly consistency checking of the messages at the level of coding of the messages into bits, means ($1023_R$) for on-the-fly consistency checking of the character stream constituting the messages and means ($1023_R$) for on-the-fly checking that the first and the second buffers of the sending (40) (TDBUF) and receiving (41) (RDBUF) parts are operating synchronously and cyclically.

14. The error detecting device according to claim 13, characterized in that the means ($108_T$) for coding the characters functions such that the characters of the messages are coded into bits in such a way as to have a null direct current component and give each character a start bit and a stop bit and the means ($1023_R$) for on-the-fly consistency checking of the messages at the level of coding of the messages into bits verifies that each character begins with a start bit and ends with a stop bit and that an accumulated current imbalance of the codes of the message flow remains contained within a predetermined range.

15. The error detecting device according to claim 14, characterized in that the messages or data are constituted by so-called "normal" characters; namely control characters comprising null characters or idle messages, start-of-frame characters containing information on the format of the messages contained in the frames in question, such as the length and/or the type of the message, and end-of-frame characters containing information on the validity of the messages contained in the frames in question and on the identity of a source buffer (TDBUF) of the messages, the control characters also comprising flow control characters (tokens), each of which is associated with a respective receiving buffer (RDBUF) and for indicating the availability of the buffer in question and the step for on-the-fly consistency checking of the character stream constituting the messages detecting the transformations of normal characters into control characters and vice versa, as a result of disturbances, and a means (CRC) for detecting the transformations of normal characters into other normal characters.

16. The error detecting device according to claim 15, characterized in that the means ($1023_R$) for checking that the first and the second buffers (TDBUF, RDBUF) of the sending (40) and receiving (41) parts are operating synchronously and cyclically comprise means for verifying that the identification or number of the first sending buffer (TDBUF) of the current message corresponds to the identification or number of the associated second receiving buffer (RDBUF), means for generating a token indicating that the second receiving buffer (RDBUF)has been cleared and that the latter is now free, and means for checking that the tokens generated during the clearing of the second receiving buffers (RDBUF) have been generated cyclically.

17. The error detecting device according to claim 16, further comprising means for verifying that the second receiving buffer (RDBUF) intended to receive the current message is free and sending a message to the receiving part (41) only if the necessary space within the necessary part is available.

18. The error detecting device according to claim 15, characterized in that it further comprises means for ensuring the clearing of the second receiving buffers (RDBUF) and setting the input and output pointers of the first sending (TDBUF) and the second receiving (RDBUF) buffers to zero upon initialization of the serial link.

19. The error detecting device according to claim 13, characterized in that the messages or data are constituted by so-called "normal" characters; namely control characters comprising null characters or idle messages, start-of-frame characters containing information on the format of the messages contained in the frames in question, such as the length and/or the type of the message, and end-of-frame characters containing information on the validity of the messages contained in the frames in question and on the identity of a source buffer (TDBUF) of the messages, the control characters also comprising flow control characters (tokens), each of which is associated with a respective receiving buffer (RDBUF) and for indicating the availability of the buffer in question and the step for on-the-fly consistency checking of the character stream constituting the messages detecting the transformations of normal characters into control characters and vice versa, as a result of disturbances, and a means (CRC) for detecting the transformations of normal characters into other normal characters.

20. The error detecting device according to claim 19, characterized in that the means ($1023_R$) for checking that the first and the second buffers (TDBUF, RDBUF) of the sending (40) and receiving (41) parts are operating synchronously and cyclically comprise means for verifying that the identification or number of the first sending buffer (TDBUF) of the current message corresponds to the identification or number of the associated second receiving buffer (RDBUF), means for generating a token indicating that a receiving buffer (RDBUF)has been cleared and that the latter is now free, and means for checking that the tokens generated during the clearing of the second receiving buffers (RDBUF) have been generated cyclically.

21. The error detecting device according to claim 20, further comprising means for verifying that the second receiving buffer (RDBUF) intended to receive the current message is free and sending a message to the receiving part (41) only if the necessary space within the necessary part is available.

22. The error detecting device according to claim 21, characterized in that it further comprises means for counting the number of free second receiving buffers (RDBUF), and means for identifying them.

23. The error detecting device according to claim 20, characterized in that it further comprises means for counting the number of free second receiving buffers (RDBUF), and means for identifying them.

24. The detecting device according to claim 13, characterized in that it further comprises two first buffers (TDBUF) for data to be transmitted and two second buffers (RDBUF) for data to be received.

25. The detecting device according to claim 13, characterized in that the serial link operates in a continuous mode, null characters or idle messages being disposed in the continuous stream between the characters or messages that have significance.

26. The detecting device according to claim 13, characterized in that the messages are requests or responses to requests.

* * * * *